US012565283B2

(12) United States Patent
Min

(10) Patent No.: US 12,565,283 B2
(45) Date of Patent: Mar. 3, 2026

(54) METHOD AND SYSTEM FOR CONTROLLING ELECTRIC BICYCLE

(71) Applicant: HL MANDO CORPORATION, Gyeonggi-do (KR)

(72) Inventor: Kyunghyun Min, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 68 days.

(21) Appl. No.: 18/628,724

(22) Filed: Apr. 6, 2024

(65) Prior Publication Data

US 2025/0249977 A1      Aug. 7, 2025

(30) Foreign Application Priority Data

Feb. 2, 2024    (KR) ........................ 10-2024-0016696

(51) Int. Cl.
_B62M 6/45_         (2010.01)
(52) U.S. Cl.
CPC ..................................... _B62M 6/45_ (2013.01)
(58) Field of Classification Search
None
See application file for complete search history.

(56) References Cited

U.S. PATENT DOCUMENTS

2009/0095552 A1    4/2009  Gulas
2018/0257740 A1*   9/2018  Kikkawa ............... B62B 5/0073
2022/0185427 A1*   6/2022  Paick ...................... B62M 19/00
2022/0194520 A1*   6/2022  Guzelgunler ........... B60L 53/16
2022/0234680 A1*   7/2022  Hong ........................ B60L 7/10
2023/0373590 A1    11/2023  Paick et al.

FOREIGN PATENT DOCUMENTS

DE      10 2022 211 073        4/2023
WO        2015/128818          9/2015

OTHER PUBLICATIONS

Ho et al., "Torque Measurement and Control for Electric-Assisted Bike Considering Different External Load Conditions", Sensors 2023 (Year: 2023).*
Office Action dated Jan. 28, 2025 for German Patent Application No. 10 2024 109 609.8 and its English translation provided by Applicant's foreign counsel.

* cited by examiner

_Primary Examiner_ — Amelia Vorce
(74) _Attorney, Agent, or Firm_ — WOMBLE BOND DICKINSON (US) LLP

(57) ABSTRACT

A method for controlling an electric bicycle comprises: detecting a pedal speed and a wheel speed; generating a wheel torque command by applying a wheel speed parameter to a difference between a wheel speed command generated by multiplying the pedal speed by a gear ratio and the wheel speed; generating a pedal torque command by applying a pedal speed parameter to the difference between the wheel speed command and the wheel speed; controlling a motor based on the wheel torque command; and controlling a generator based on the pedal torque command.

20 Claims, 8 Drawing Sheets

FIG. 3A

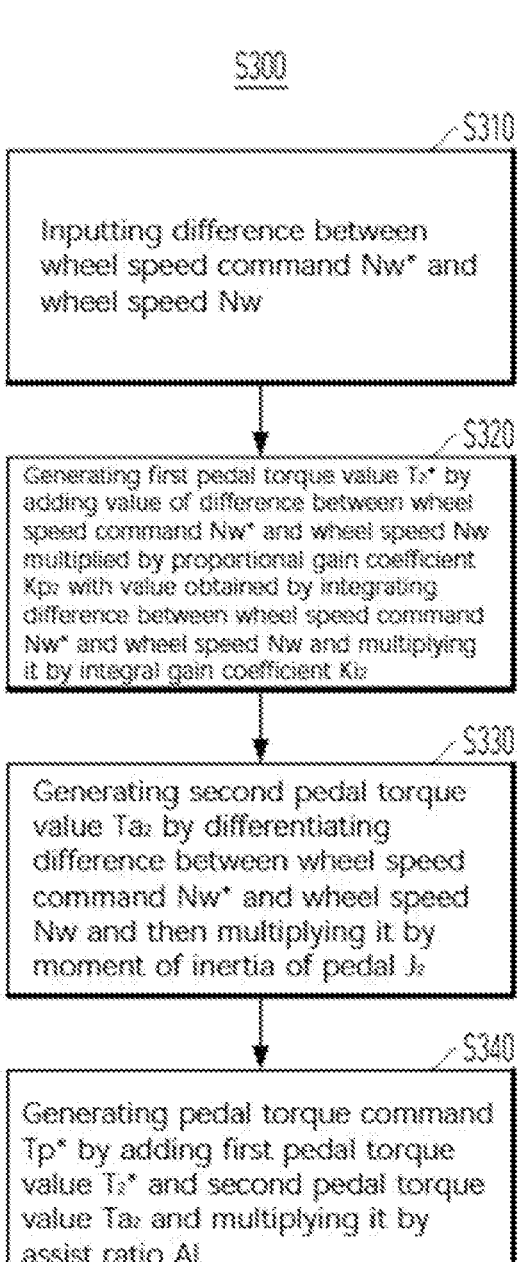

S300

S310
Inputting difference between wheel speed command Nw* and wheel speed Nw

S320
Generating first pedal torque value $T_2^*$ by adding value of difference between wheel speed command Nw* and wheel speed Nw multiplied by proportional gain coefficient $K_{P2}$ with value obtained by integrating difference between wheel speed command Nw* and wheel speed Nw and multiplying it by integral gain coefficient $K_{I2}$ S330
Generating second pedal torque value $Ta_2$ by differentiating difference between wheel speed command Nw* and wheel speed Nw and then multiplying it by moment of inertia of pedal $J_2$ S340
Generating pedal torque command Tp* by adding first pedal torque value $T_2^*$ and second pedal torque value $Ta_2$ and multiplying it by assist ratio AL

METHOD AND SYSTEM FOR CONTROLLING ELECTRIC BICYCLE

CROSS-REFERENCE TO RELATED APPLICATION

This application claims the benefit of and priority to Korean Patent Application No. 2024-0016696 filed on Feb. 2, 2024, the entire disclosures of which are incorporated herein by reference.

TECHNICAL FIELD

The present disclosure relates to a method and system for controlling an electric bicycle. More specifically, the present disclosure relates to relates to a method and system for controlling an electric bicycle that improves pedal feeling by controlling the pedal speed according to a pedal speed parameter provided separately from a wheel speed parameter, in a chainless electric bicycle driven by a motor.

BACKGROUND

An electric bicycle (including an e-cargo) assists a person or drives the electric bicycle by driving a motor with electricity. A PAS (Pedal Assistance System) type method uses the power of a motor to assist a person stepping on a pedal to drive the wheels, and a throttle type method drives the wheels only with the power of the motor by pulling a handle. In addition, there is also a PAS/throttle type electric bicycle that supports both the PAS type method and the throttle type method.

In general, an electric bicycle without a chain (chainless electric bicycle) recognizes the speed at which the user rotates the pedal and controls the speed of the motor in proportion to the pedal speed. Since there is no chain attached to the pedal, no load is applied, so the generator (alternator) connected to the pedal is controlled to generate a pedal load similar to that of a bicycle having a chain. By controlling the load on the pedal according to the speed of the electric bicycle, the user can feel a pedal feeling similar to that of the bicycle having a chain.

Meanwhile, in the prior art, in generating a pedal feeling, a motor torque is generated by rotating the pedal, and the pedal feeling is generated based on the motor torque.

According to this method according to the prior art, if the rotational speed of the pedal is greater than the wheel speed, the pedal feeling is controlled to become heavier, and if the rotational speed of the pedal is less than the wheel speed, the pedal feeling is controlled to become lighter.

However, in this case, if the pedal feeling is generated based on the wheel speed, for example, if the pedal is pressed strongly, there is a problem that a pedal slip-through phenomenon in which the pedal is pushed too much due to the weak pedal reaction force may occur, causing discomfort to the driver.

Therefore, there is a need for a method and system for controlling an electric bicycle that generates a driving feeling more similar to a bicycle having a chain in a chainless electric bicycle and also prevents the pedal from slipping so that the driver can feel a stable pedal feeling.

SUMMARY

The present disclosure is to solve the above-mentioned problems of the prior art, and an object of the present disclosure is to provide a method and system for controlling an electric bicycle that enables to perform the control suitable for each system by including the pedal speed controller suitable for the pedal system provided separately from the wheel speed controller that controls the acceleration performance of the electric bicycle.

Further, an object of the present disclosure is to provide a method and system for controlling an electric bicycle that provides a stable pedal feeling regardless of the characteristics of the electric bicycle by controlling the pedal feeling using a pedal speed parameter.

However, the technical problem to be achieved by the embodiments of the present disclosure is not limited to the technical problems described above, and other technical problems may exist.

As a technical means for achieving the above technical problem, a method for controlling an electric mobility according to an embodiment of the present disclosure comprises: detecting a pedal speed and a wheel speed; generating a wheel torque command by applying a wheel speed parameter to a difference between a wheel speed command generated by multiplying the pedal speed by a gear ratio and the wheel speed; generating a pedal torque command by applying a pedal speed parameter to the difference between the wheel speed command and the wheel speed; controlling a motor based on the wheel torque command; and controlling a generator based on the pedal torque command.

Further, the generating of the pedal torque command may be performed by a different controller from that in which the generating of the wheel torque command is performed.

Further, the generating of the wheel torque command may comprise: receiving the difference between the wheel speed command and the wheel speed; generating a first wheel torque value by adding a value of the difference between the wheel speed command and the wheel speed multiplied by a proportional gain coefficient according to the wheel speed parameter with a value obtained by integrating the difference between the wheel speed command and the wheel speed and multiplying it by an integral gain coefficient according to the wheel speed parameter; generating a second wheel torque value by differentiating the difference between the wheel speed command and the wheel speed and then multiplying it by a moment of inertia of the wheel; and generating a wheel torque command by adding the first wheel torque value and the second wheel torque value.

Further, the proportional gain coefficient according to the wheel speed parameter may be proportional to the moment of inertia of the wheel.

Further, the moment of inertia of the wheel may be determined based on at least one of a weight of the electric bicycle, the number of motors, or a size of the wheel.

Further, the generating of the first wheel torque value may include performing an anti-windup control to limit an output value by controlling an integral value in integrating the difference between the wheel speed command and the wheel speed.

Further, the controlling of the motor may comprise: detecting a driving current of the motor; generating a motor torque control current based on the difference between the wheel current command and the driving current of the motor and applying the motor torque control current to the motor.

Further, the generating of the pedal torque command may comprise: generating a first pedal torque value by adding a value of the difference between the wheel speed command and the wheel speed multiplied by a proportional gain coefficient according to the pedal speed parameter with a value obtained by integrating the difference between the wheel speed command and the wheel speed and multiplying it by an integral gain coefficient according to the pedal speed parameter; generating a second pedal torque value by differentiating the difference between the wheel speed command and the wheel speed and then multiplying it by a moment of inertia of the pedal; and generating a pedal torque command by adding the first pedal torque value and the second pedal torque value and multiplying it by an assist ratio.

Further, the proportional gain coefficient according to the pedal speed parameter may be proportional to the moment of inertia of the pedal.

Further, the moment of inertia of the pedal may be determined based on the characteristics of the pedal regardless of a weight of the electric bicycle, the number of motors, or a size of the wheel.

Further, the generating of the first pedal torque value may be performed by controlling to continuously integrate the difference between the wheel speed command and the wheel speed.

Further, the controlling of the generator may comprise: detecting a driving current of the generator; generating a pedal current command based on the pedal torque command; and generating a generator torque control current based on the difference between the pedal current command and the driving current of the generator and applying the generator torque control current to the generator.

A system for controlling an electric mobility according to the embodiment of the present disclosure comprises: a pedal speed sensor configured to detect a pedal speed; a wheel speed sensor configured to detect a wheel speed; a motor current sensor configured to detect a driving current of a motor; a generator current sensor configured to detect a driving current of a generator; a controller configured to control the electric bicycle; a wheel actuator configured to control the motor; and a pedal actuator configured to control the generator, wherein the controller comprises: a wheel speed controller configured to generate a wheel torque command by applying a wheel speed parameter to the difference between the wheel speed and the wheel speed command generated by multiplying the pedal speed by the gear ratio; and a pedal speed controller configured to generate a pedal torque command by applying a pedal speed parameter to the difference between the wheel speed command and the wheel speed.

Further, the wheel speed controller may be configured to: receive the difference between the wheel speed command and the wheel speed; generate a first wheel torque value by adding a value of the difference between the wheel speed command and the wheel speed multiplied by a proportional gain coefficient according to the wheel speed parameter with a value obtained by integrating the difference between the wheel speed command and the wheel speed and multiplying it by an integral gain coefficient according to the wheel speed parameter; generate a second wheel torque value by differentiating the difference between the wheel speed command and the wheel speed and then multiplying it by a moment of inertia of the wheel; and generate a wheel torque command by adding the first wheel torque value and the second wheel torque value.

Further, the wheel speed controller may be configured to perform an anti-windup control to limit an output value by controlling an integral value when integrating the difference between the wheel speed command and the wheel speed.

Further, the pedal speed controller may be configured to: receive the difference between the wheel speed command and the wheel speed; generate a first pedal torque value by adding a value of the difference between the wheel speed command and the wheel speed multiplied by a proportional gain coefficient according to the pedal speed parameter with a value obtained by integrating the difference between the wheel speed command and the wheel speed and multiplying it by an integral gain coefficient according to the pedal speed parameter; generate a second pedal torque value by differentiating the difference between the wheel speed command and the wheel speed and then multiplying it by a moment of inertia of the pedal; and generate a pedal torque command by adding the first pedal torque value and the second pedal torque value and multiplying it by an assist ratio.

Further, the moment of inertia of the pedal may be determined based on the characteristics of the pedal regardless of the weight of the electric bicycle, the number of motors, or the size of the wheel.

Further, the pedal speed controller may be configured to generate the first pedal torque value by continuously integrating the difference between the wheel speed command and the wheel speed.

Further, the controller may comprise: a wheel torque controller configured to generate a wheel current command based on the wheel torque command generated by the wheel speed controller; and a pedal torque controller configured to generate a pedal current command based on the pedal torque command generated by the pedal speed controller.

Further, the wheel actuator may be configured to control the motor by applying a motor torque control current generated based on the difference between the wheel current command and the detected driving current of the motor, and the pedal actuator may be configured to control the generator by applying a pedal torque control current generated based on the difference between the pedal current command and the detected driving current of the generator.

The above-described means for solving the problem is only exemplary and should not be construed as limiting the present disclosure. In addition to the exemplary embodiments described above, additional embodiments may exist in the drawings and the following detailed description.

According to the above-described problem-solving means of the present disclosure, it is possible to provide a method and system for controlling an electric bicycle that can control the electric bicycle by applying the parameter(s) suitable for each system by including a pedal speed controller provided separately from a wheel speed controller, in a chainless electric bicycle.

In addition, according to the above-described problem-solving means of the present disclosure, it is possible to provide a method and system for controlling the electric bicycle that can improve the pedal feeling by preventing the pedal slip phenomenon by which the pedal is pushed due to the weak pedal reaction force with providing the same pedal feeling regardless of the characteristics of the vehicle.

However, the effects obtainable from the present disclosure are not limited to the effects described above, and other effects may exist.

BRIEF DESCRIPTION OF THE DRAWINGS

FIG. 3A is a flowchart specifically showing the step of generating a pedal torque command in the method for controlling the electric bicycle according to the embodiment of the present disclosure.

DETAILED DESCRIPTION

Figure 1:
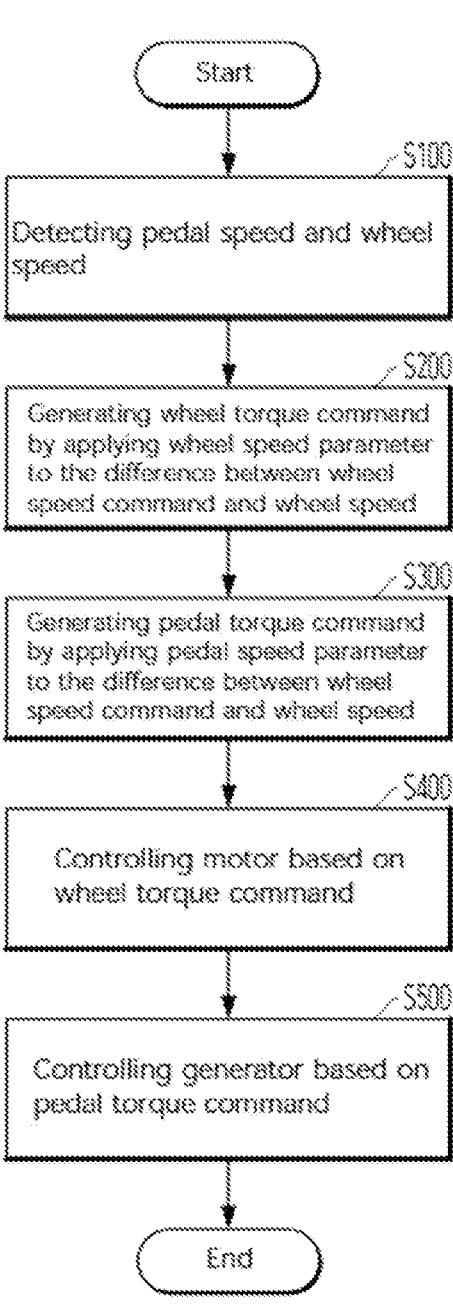
FIG. 1 is a flowchart showing a method for controlling an electric bicycle according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for controlling an electric bicycle for providing a stable pedal feeling by controlling the pedal feeling using pedal speed parameters suitable for a pedal system in a chainless electric bicycle.

FIG. 1 is a flowchart showing a method for controlling an electric bicycle according to an embodiment of the present disclosure.

Referring to FIG. 1, the method for controlling the electric bicycle according to the embodiment of the present disclosure may include detecting the pedal speed and the wheel speed S100. For example, the pedal speed may be detected by a pedal speed sensor, and the wheel speed may be detected by a wheel speed sensor.

Next, a step of generating a wheel torque command S200 may be performed by applying a wheel speed parameter to the difference between the wheel speed command generated by multiplying the rotational speed of the pedal by the gear ratio and the wheel speed.

In this wheel torque command generation step S200, a predetermined wheel speed parameter may be applied to generate a wheel torque command, and a specific embodiment of the wheel torque command generation step applying the wheel speed parameter(s) will be explained in more detail in the description of FIG. 2A.

In addition, according to the embodiment of the present disclosure, a step of generating a pedal torque command by applying a pedal speed parameter to the difference between the wheel speed command generated by multiplying the rotational speed of the pedal by the gear ratio and the wheel speed may be performed (S300).

In this pedal torque command generation step S300, a predetermined pedal speed parameter may be applied to generate a pedal torque command, and a specific embodiment of the pedal torque command generation step applying the pedal speed parameter(s) will be explained in more detail in the description of FIG. 3A.

In addition, according to an embodiment of the present disclosure, a step of controlling the motor based on the generated wheel torque command S400 and a step of controlling the generator based on the generated pedal torque command S500 may be performed.

According to this embodiment of the present disclosure, in a chainless electric bicycle, a pedal torque command may be generated by applying the pedal speed parameter provided separately from the wheel speed parameter to the difference between the wheel speed command and the wheel speed. Therefore, it is possible to achieve the pedal feeling by generating the pedal torque command optimized for the control response of the pedal system of the electric bicycle.

Figure 2A:
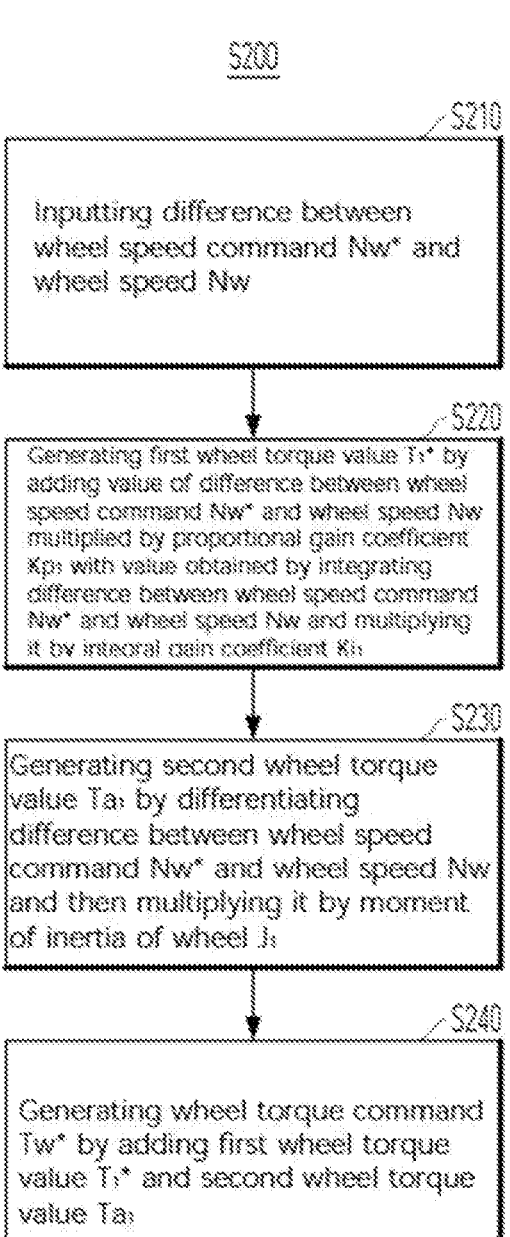
FIG. 2A is a flowchart specifically showing the step of generating a wheel torque command in the method for controlling the electric bicycle according to the embodiment of the present disclosure.

FIG. 2A is a flowchart specifically showing the step of generating a wheel torque command in the method for controlling the electric bicycle according to the embodiment of the present disclosure.

Referring to FIG. 2A, the wheel torque command generation step S200 may include inputting the difference between the wheel speed command Nw* and the wheel speed Nw (S210), generating a first wheel torque value $T_1$* by adding a value of the difference between the wheel speed command Nw* and the wheel speed Nw multiplied by a proportional gain coefficient $Kp_1$ according to the wheel speed parameter with a value obtained by integrating the difference between the wheel speed command Nw* and the wheel speed Nw and multiplying it by an integral gain coefficient $Ki_1$ according to the wheel speed parameter (S220), generating a second wheel torque value $Ta_1$ by differentiating the difference between the wheel speed command Nw* and the wheel speed Nw and then multiplying it by a moment of inertia of the wheel $J_1$ (S230), and generating a wheel torque command Tw* by adding the first wheel torque value $T_1$* and the second wheel torque value $Ta_1$ (S240).

This wheel torque command generation step may be performed by a proportional-integral-differential (PID) controller.

The difference (Nw*-Nw) between the wheel speed command Nw* and the wheel speed Nw may also be called as an error, and it may be controlled such that the value of the error is 0, that is, the wheel speed follows the wheel speed command.

For this purpose, the difference between the wheel speed command Nw* and the wheel speed Nw may be input in step S210, and in step S220, the first wheel torque value $T_1$* may be generated by adding the value of the difference between the wheel speed command Nw* and the wheel speed Nw multiplied by the proportional gain coefficient $Kp_1$ according to the wheel speed parameter with the value obtained by integrating the difference between the wheel speed command Nw* and the wheel speed Nw and multiplying it by the integral gain coefficient $Ki_1$ according to the wheel speed parameter.

For example, the first wheel torque value $T_1$* may be obtained by the following equation.

$$T_1^* = Kp_1 \times (Nw^* - Nw) + Ki_1 \int (Nw^* - Nw)dt \qquad \text{[Equation 1]}$$

Here, the proportional gain coefficient $Kp_1$ according to the wheel speed parameter may be proportional to the moment of inertia of the wheel $J_1$. Further, the proportional gain coefficient $(Kp_1)$ according to the wheel speed parameter may also be proportional to a vehicle acceleration frequency (a frequency suitable for the motor system). For example, the vehicle acceleration frequency (control bandwidth) may be approximately 0.1 to 0.35 Hz.

Meanwhile, the moment of inertia of the wheel $J_1$ may have a value determined based on at least one of the weight of the electric bicycle, the number of motors, or the size of the wheel. For example, if the weight of the electric bicycle is heavy, the moment of inertia of the wheel $J_1$ may become large, and accordingly the proportional gain coefficient $Kp_1$ according to the wheel speed parameter may also have a large value.

In addition, the proportional gain coefficient $Kp_1$ and integral gain coefficient $Ki_1$ according to the wheel speed parameter may have values that allow for a low response speed (low response gain) considering the characteristics of the electric bicycle. By controlling the wheel speed according to the proportional gain coefficient $Kp_1$ and integral gain coefficient $Ki_1$ that enable such a low response speed, a rapid acceleration of the electric bicycle can be suppressed and a smooth acceleration feeling can be achieved.

Meanwhile, when generating the first wheel torque value $T_1$*, in integrating the difference between the wheel speed command Nw* and the wheel speed Nw, an anti-windup control, which limits an output value by controlling the integral value may be performed.

If the error (the difference between wheel speed command and the wheel speed) is continuously integrated, excessive force may be transmitted to the actuator due to the accumulation of errors, which may cause vibration or unintended acceleration of the electric bicycle. Therefore, through the anti-windup control, the driving stability of the electric bicycle can be effectively promoted by limiting the output of the wheel actuator by controlling the integral value so that the accumulated errors are reduced over time.

Then, in step S230, the difference between the wheel speed command Nw* and the wheel speed Nw may be differentiated and then multiplied by the moment of inertia of the wheel $J_1$ to generate the second wheel torque value $Ta_1$. The second wheel torque value $Ta_1$ calculated in this way can be said to be forward compensation torque caused by the wheel acceleration.

For example, this second wheel torque value $Ta_1$ may be obtained by the following equation.

$$Ta_1 = (Nw^* - Nw)d/dt \times J_1 \times \text{gain}_1 \qquad \text{[Equation 2]}$$

In other words, the forward compensation torque of the wheel may be obtained by differentiating the difference between the wheel speed command Nw* and the wheel speed Nw and then multiplying it by the moment of inertia of the wheel $J_1$ and a gain value $\text{gain}_1$.

Next, the wheel torque command Tw* may be generated by adding the first wheel torque value $T_1$* and the second wheel torque value $Ta_1$ (S240). Further, the motor may be controlled according to the wheel torque command Tw*.

Figure 2B:
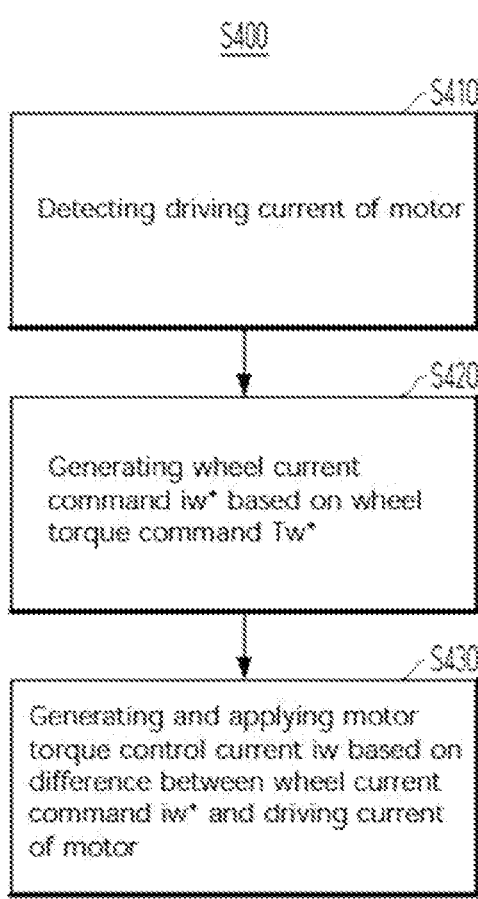
FIG. 2B is a flowchart specifically showing the step of controlling a motor according to the wheel torque command in the method for controlling the electric bicycle according to the embodiment of the present disclosure.

FIG. 2B is a flowchart specifically showing the step of controlling a motor according to the wheel torque command in the method for controlling the electric bicycle according to the embodiment of the present disclosure.

Referring to FIG. 2B, the step of controlling the motor S400 may include detecting a driving current of the motor S410, generating a wheel current command iw* based on the wheel torque command Tw* S420, and generating and applying a motor torque control current iw based on the difference between the wheel current command iw* and the driving current of the motor S430.

Here, the detecting of the driving current of the motor may be performed by a motor current sensor, and the wheel current command iw* for driving the motor may be calculated from the wheel torque command Tw* previously generated in step S200 and the motor may be controlled by applying the motor torque control current iw such that the driving current of the motor follows the wheel current command iw*.

FIG. 3A is a flowchart specifically showing the step of generating a pedal torque command in the method for controlling the electric bicycle according to the embodiment of the present disclosure.

Referring to FIG. 3A, the pedal torque command generating step S300 may include inputting the difference between the wheel speed command Nw* and the wheel speed Nw (S310), generating a first pedal torque value $T_2$* by adding a value of the difference between the wheel speed command Nw* and the wheel speed Nw multiplied by a proportional gain coefficient $Kp_2$ according to the pedal speed parameter with a value obtained by integrating the difference between the wheel speed command Nw* and the wheel speed Nw and multiplying it by an integral gain coefficient $Ki_2$ according to the pedal speed parameter (S320), generating a second pedal torque value $Ta_2$ by differentiating the difference between the wheel speed command Nw* and the wheel speed Nw and then multiplying it by a moment of inertia of the pedal $J_2$ (S330), and generating a pedal torque command Tp* by adding the first pedal torque value $T_2$* and the second pedal torque value $Ta_2$ and multiplying it by an assist ratio AL (S340).

This pedal torque command generation step may also be performed by a proportional-integral-differential (PID) controller.

First, the difference between the wheel speed command Nw* and the wheel speed Nw may be input in step S310, and in step S320, the first pedal torque value $T_2$* may be generated by adding the value of the difference (Nw*-Nw) between the wheel speed command Nw* and the wheel speed Nw multiplied by the proportional gain coefficient $Kp_2$ according to the pedal speed parameter with the value obtained by integrating the difference between the wheel speed command Nw* and the wheel speed Nw and multiplying it by the integral gain coefficient $Ki_2$ according to the pedal speed parameter.

Here, the proportional gain coefficient $Kp_2$ according to the pedal speed parameter may be an independent value from the proportional gain coefficient $Kp_1$ according to the wheel speed parameter, and the integral gain coefficient $Ki_2$ according to the pedal speed parameter may also be an independent value from the integral gain parameter $Ki_1$. Each of the proportional gain coefficient $Kp_2$ according to the pedal speed parameter and the integral gain coefficient $Ki_2$ according to the pedal speed parameter may be a parameter suitable for the pedal system.

For example, the first pedal torque value $T_2*$ may be obtained by the following equation.

$$T_2^* = Kp_2 \times (Nw^* - Nw) + Ki_2 \int (Nw^* - Nw)dt \qquad \text{[Equation 3]}$$

Here, the proportional gain coefficient $Kp_2$ according to the pedal speed parameter may be proportional to a moment of inertia of the pedal $J_2$. Further, the proportional gain coefficient $Kp_2$ according to the pedal speed parameter may also be proportional to a pedal feeling frequency (a frequency suitable for the pedal system). For example, the pedal feeling frequency (the control bandwidth) may be approximately 0.3 to 0.5 Hz.

Meanwhile, the moment of inertia of the pedal $J_2$ may not be related to the weight of the electric bicycle, the number of motors, or the size of the wheel, and may be determined based on the characteristics of the pedal (the inertia of the pedal itself).

In addition, the proportional gain coefficient $Kp_2$ and the integral gain coefficient $Ki_2$ according to the pedal speed parameter may have values that enable a high response speed (high response gain) considering the characteristics of the pedal system. That is, $Kp_2$ may have a value greater than $Kp_1$, and $Ki_2$ may have a value greater than $Ki_1$. By controlling the pedal speed according to the proportional gain coefficient $Kp_2$ and integral gain coefficient $Ki_2$ that enable such a high response speed, it is possible to generate a pedal feeling suitable for the pedal system and also generate a pedal feeling similar to that of a bicycle having a chain.

Meanwhile, in the step of generating the first pedal torque value $T_2*$, unlike the step of generating the first wheel torque value, the anti-windup control may not be performed and it may be controlled so that the difference between the wheel speed command and the wheel speed are continuously integrated.

In this way, when generating the pedal torque command, unlike when generating the wheel torque command, since the continuous integration is performed without the anti-windup control (continuous error accumulation), it is possible to prevent the phenomenon that the pedal is pushed too much when strongly pressed due to the weak pedal reaction force (pedal slip-through) from occurring, and it is possible to generate a pedal feeling more similar to that of a bicycle having a chain.

Meanwhile, for example, if the error value, which is the difference between the wheel speed command and the wheel speed, is less than 0 ($Nw^*-Nw<0$), an overshoot phenomenon can be prevented by initializing the accumulated errors of the integrator. As a result, it is possible to prevent unnecessary pedal feeling from generating when the pedal is rotated slowly, thereby suppressing the side effects of performing continuous integration.

Then, in step S330, the difference between the wheel speed command $Nw^*$ and the wheel speed $Nw$ may be differentiated and then multiplied by the moment of inertia of the pedal $J_2$ to generate a second pedal torque value $Ta_2$.

The second pedal torque value $Ta_2$ calculated in this way can be said to be forward compensation torque caused by the pedal acceleration.

For example, this second pedal torque value $Ta_2$ may be obtained by the following equation.

$$Ta_2 = (Nw^* - Nw)d/dt \times J_2 \times \text{gain}_2 \qquad \text{[Equation 4]}$$

In other words, the forward compensation torque of the pedal may be obtained by differentiating the difference between the wheel speed command $Nw^*$ and the wheel speed $Nw$ and then multiplying it by the moment of inertia of the pedal $J_2$ and a gain value $\text{gain}_2$.

Next, the pedal torque command $Tp^*$ may be generated by adding the first pedal torque value $T_2*$ with the second pedal torque value $Ta_2$ and then multiplying it by the assist ratio AL (S340). This assist ratio (or assist level) is a value that can be set, and depending on the set assist ratio, the pedal torque command $Tp^*$ may be made larger or smaller than the result value $(T_2*+Ta_2)$ according to the pedal speed parameter. Therefore, it is possible to adjust the pedal feeling to be lighter or heavier depending on the user's intention.

Figure 3B:
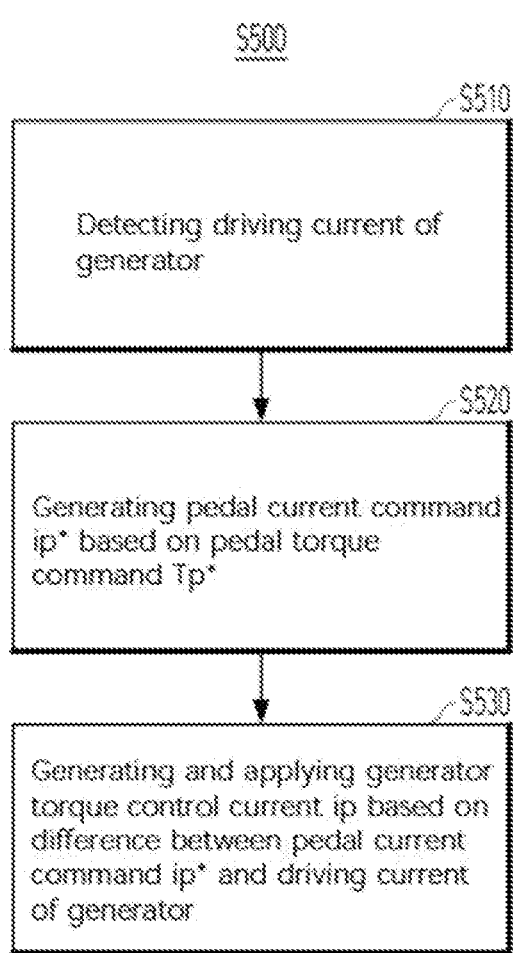
FIG. 3B is a flowchart specifically showing the step of controlling a generator according to the pedal torque command in the method for controlling the electric bicycle according to the embodiment of the present disclosure.

FIG. 3B is a flowchart specifically showing the step of controlling a generator according to the pedal torque command in the method for controlling the electric bicycle according to the embodiment of the present disclosure.

Referring to FIG. 3B, the step of controlling the generator S500 may include detecting a driving current of the generator (S510), generating a pedal current command $ip^*$ based on the pedal torque command $Tp^*$ (S520), and generating and applying a generator torque control current ip based on the difference between the pedal current command $ip^*$ and the driving current of the generator (S530).

Here, the detecting of the driving current of the generator may be performed by a generator current sensor, and the pedal current command $ip^*$ for driving the generator may be calculated from the pedal torque command $Tp^*$ previously generated in step S300 and the generator may be controlled by applying the generator torque control current ip such that the driving current of the generator follows the pedal current command $ip^*$.

According to the embodiment of the present disclosure as described above, in generating the pedal torque command, the pedal torque command is generated based on the pedal speed parameter provided separately from the wheel speed parameter, thereby generating the pedal torque command independently of the wheel torque command, and thus, it is possible to generate a pedal feeling suitable for the pedal system.

Figure 4:
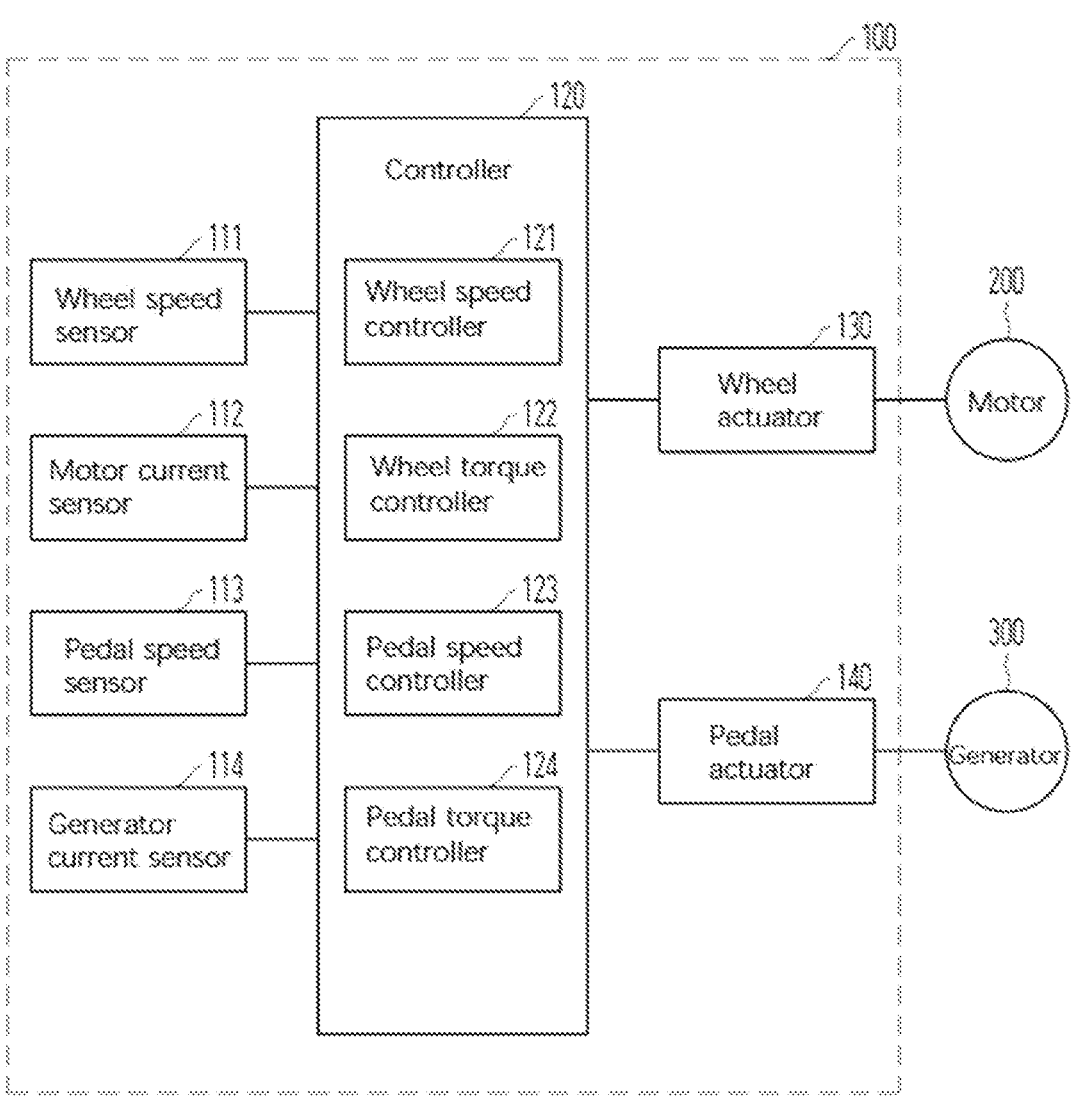
FIG. 4 is a control block diagram schematically showing a system for controlling an electric bicycle according to the embodiment of the present disclosure.

FIG. 4 is a control block diagram schematically showing a system for controlling an electric bicycle according to the embodiment of the present disclosure.

Figure 5:
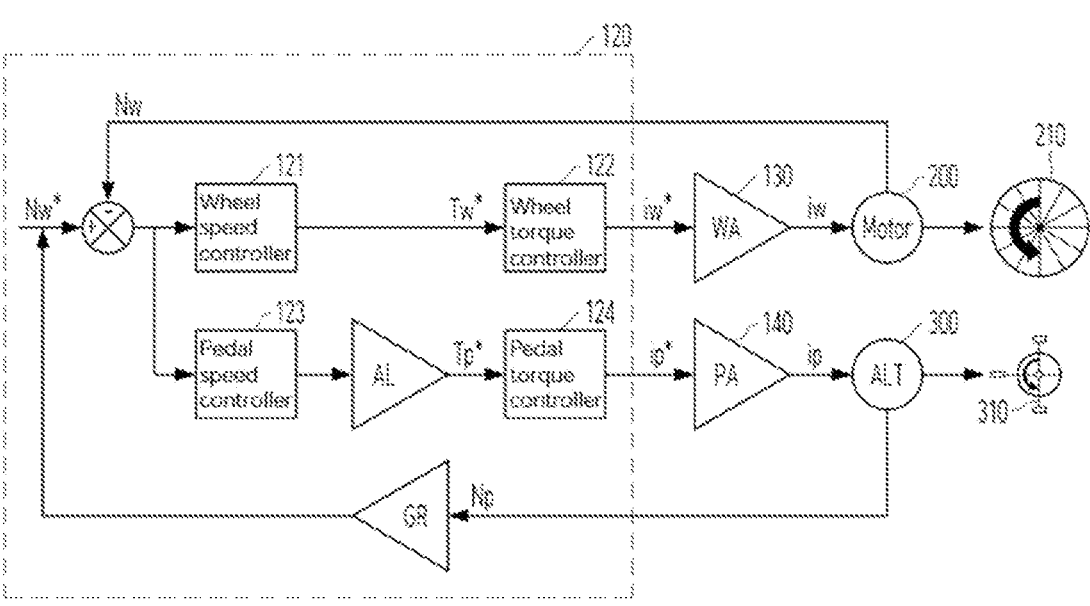
FIG. 5 is a structural diagram schematically showing the structure of the electric bicycle including the system for controlling the electric bicycle according to the embodiment of the present disclosure.

Further, FIG. 5 is a structural diagram schematically showing the structure of the electric bicycle including the system for controlling the electric bicycle according to the embodiment of the present disclosure. Meanwhile, in FIG. 5, Np represents to the pedal speed, GR represents the gear ratio, Nw represents the wheel speed, $Nw^*$ represents the wheel speed command, $Tw^*$ represents the wheel torque command, $Tp^*$ represents the pedal torque command, and AL represents the assist ratio, $iw^*$ represents the wheel current command, iw represents the motor torque control current, $ip^*$ represents the pedal current command, and ip represents the generator torque control current.

As shown in FIGS. 4 and 5, the system for controlling an electric bicycle 100 according to the embodiments of the present disclosure may include a wheel speed sensor 111 configured to detect the wheel speed, a motor current sensor 112 configured to detect the driving current of the motor, a pedal speed sensor 113 configured to detect the pedal speed, a generator current sensor 114 configured to detect the driving current of the generator, a controller 120 configured to control the electric bicycle, a wheel actuator (WA) 130 configured to control the motor 200, and a pedal actuator (PA) 140 configured to control the generator 300.

Further, the controller 120 may include a wheel speed controller 121 configured to generate the wheel torque command Tw* by applying the wheel speed parameter to the difference between the wheel speed command Nw* generated by multiplying the pedal speed Np by the gear ratio GR and the wheel speed Nw, and a pedal speed controller 123 configured to generate the pedal torque command Tp* by applying the pedal torque parameter to the difference between the wheel speed command Nw* and the wheel speed Nw.

In addition, the controller 120 may include a wheel torque controller 122 configured to generate the wheel current command iw* based on the wheel torque command Tw* generated by the wheel speed controller 121, and a pedal torque controller 124 configured to generate the pedal current command ip* based on the pedal torque command Tp* generated by the pedal speed controller 123.

Meanwhile, the wheel actuator (WA) 130 may control the motor 200 by applying the motor torque control current iw generated based on the difference between the wheel current command iw* and the detected driving current of the motor, thereby rotating the wheel 210 mechanically connected with the motor 200.

Further, the pedal actuator (PA) 140 may control the generator 300 by applying the generator torque control current ip generated based on the difference between the pedal current command ip* and the detected driving current of the generator, thereby controlling the pedal feeling of the pedal (ePedal) 310.

According to the system for controlling the electric bicycle 100 having the above configuration, the pedal speed controller 123, which is separate from the wheel speed controller 121, can control the pedal feeling by applying the pedal speed parameter suitable for the pedal system. Therefore, it is possible to provide the same pedal feeling regardless of the characteristics of the vehicle (the weight, the wheel size, the number of motors, the type of the motor, etc.).

Figure 6:
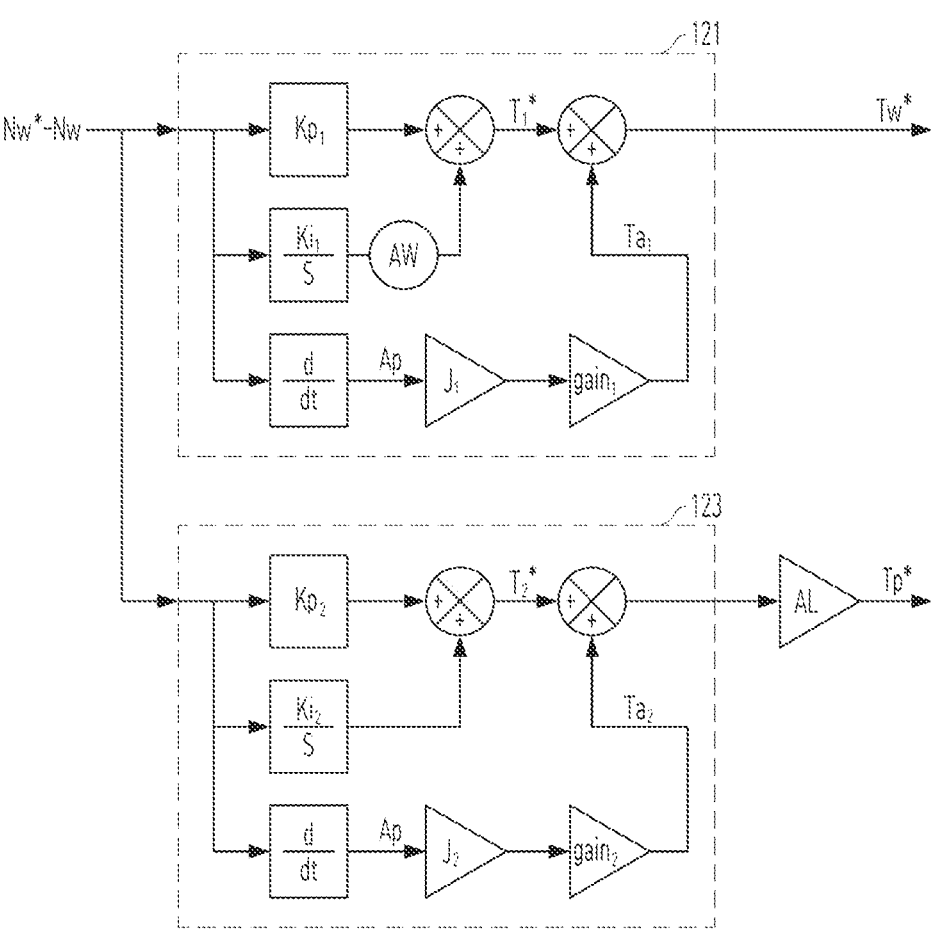
FIG. 6 is a diagram specifically showing a wheel speed controller and a pedal speed controller in the structure of the electric bicycle including the system for controlling the electric bicycle according to the embodiment of the present disclosure.

FIG. 6 is a diagram specifically showing a wheel speed controller and a pedal speed controller in the structure of the electric bicycle including the system for controlling the electric bicycle according to the embodiment of the present disclosure.

As shown in FIG. 6, each of the wheel speed controller 121 and the pedal speed controller 123 according to the embodiments of the present disclosure may be a PID controller (proportional-integral-derivative controller).

As described above, the wheel speed controller 121 may receive the difference between the wheel speed command and the wheel speed (Nw*-Nw), generate the first wheel torque value $T_1$* by adding a value of the difference between the wheel speed command and the wheel speed (Nw*-Nw) multiplied by the proportional gain coefficient $Kp_1$ according to the wheel speed parameter with a value obtained by integrating the difference between the wheel speed command and the wheel speed (Nw*-Nw) and multiplying it by the integral gain coefficient $Ki_1$ according to the wheel speed parameter, generate the second wheel torque value $Ta_1$ by differentiating the difference between the wheel speed command and the wheel speed (Nw*-Nw) and then multiplying it by the moment of inertia of the wheel $J_1$, and generate the wheel torque command Tw* by adding the first wheel torque value $T_1$* and the second wheel torque value $Ta_1$.

Here, the moment of inertia of the wheel $J_1$ may be determined based on at least one of the weight of the electric bicycle, the number of motors, and the size of the wheel.

Further, the wheel speed controller 121 may further include an anti-windup (AW) control, and may control the integral value when integrating the difference between the wheel speed command and the wheel speed (Nw*-Nw) such that the output value is controlled to be limited.

In addition, the pedal speed controller 123 may receive the difference between the wheel speed command and the wheel speed (Nw*-Nw), generate the first pedal torque value $T_2$* by adding a value of the difference between the wheel speed command and the wheel speed (Nw*-Nw) multiplied by the proportional gain coefficient $Kp_2$ according to the pedal speed parameter with a value obtained by integrating the difference between the wheel speed command and the wheel speed (Nw*-Nw) and multiplying it by the integral gain coefficient $Ki_2$ according to the pedal speed parameter, generate the second pedal torque value $Ta_2$ by differentiating the difference between the wheel speed command and the wheel speed (Nw*-Nw) and then multiplying it by the moment of inertia of the pedal $J_2$, and generate the pedal torque command Tp* by adding the first pedal torque value $T_2$* and the second pedal torque value $Ta_2$ and multiplying it by the the the assist ratio AL.

Here, the moment of inertia of the pedal $J_2$ may be determined based on the characteristics of the pedal regardless of the weight of the electric bicycle, the number of motors, or the size of the wheel.

Further, the pedal speed controller 123 may generate the first pedal torque value $T_2$* by controlling to continuously integrate the difference between the wheel speed command and the wheel speed (Nw*-Nw). In this way, the phenomenon by which the pedal is pushed when pressing the pedal strongly can be reduced and the pedal feeling can be improved.

However, if the difference between the wheel speed command and the wheel speed (Nw*-Nw) is less than 0, the integral value can be initialized to prevent the overshoot phenomenon.

According to the wheel speed controller 121 and the pedal speed controller 123 of the structure of the electric bicycle according to the embodiments of the present disclosure as described above, it is controlled to generate a torque command (wheel torque command or pedal torque command) suitable for each system (the motor system or the pedal system) by applying different parameters to the same input value (Nw*-Nw). Accordingly, it is possible to perform the control optimized for each system performance.

As discussed above, according to the embodiments of the present disclosure, the pedal torque command can be generated using pedal parameters suitable for the pedal system. Therefore, it is possible to provide a method and system for controlling the electric bicycle that can generate a pedal feeling similar to that of a bicycle with a chain and prevent the slip-through phenomenon of the pedal, thereby generating a more stable pedal feeling.

Moreover, according to the embodiments of the present disclosure, by generating the pedal torque command using the pedal speed controller separate from the wheel speed controller, it is possible to provide the same pedal feeling regardless of factors such as the weight of the electric bicycle, the size of the wheel, the number of motors, and the type of the motor, and also, the pedal feeling can be tuned differently depending on the driver's preference.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

100: System for controlling electric bicycle
111: Wheel speed sensor
112: Motor current sensor
113: Pedal speed sensor
114: Generator current sensor
120: Controller
121: Wheel speed controller
122: Wheel torque controller
123: Pedal speed controller
124: Pedal torque controller
130: Wheel actuator (WA)
140: Pedal actuator (PA)
200: Motor
210: Wheel
300: Generator (Alternator)
310: Pedal

What is claimed is:

1. A method for controlling an electric bicycle, comprising:
    detecting a pedal speed and a wheel speed;
    generating a wheel torque command by applying a wheel speed parameter to a difference between a wheel speed command generated by multiplying the pedal speed by a gear ratio and the wheel speed;
    generating a pedal torque command by applying a pedal speed parameter to the difference between the wheel speed command and the wheel speed;
    controlling a motor based on the wheel torque command; and
    controlling a generator based on the pedal torque command.

2. The method of claim 1, wherein the generating of the pedal torque command is performed by a different controller from that in which the generating of the wheel torque command is performed.

3. The method of claim 1, wherein the generating of the wheel torque command comprises:
    receiving the difference between the wheel speed command and the wheel speed;
    generating a first wheel torque value by adding a value of the difference between the wheel speed command and the wheel speed multiplied by a proportional gain coefficient according to the wheel speed parameter with a value obtained by integrating the difference between the wheel speed command and the wheel speed and multiplying it by an integral gain coefficient according to the wheel speed parameter;
    generating a second wheel torque value by differentiating the difference between the wheel speed command and the wheel speed and then multiplying it by a moment of inertia of the wheel; and
    generating a wheel torque command by adding the first wheel torque value and the second wheel torque value.

4. The method of claim 3, wherein the proportional gain coefficient according to the wheel speed parameter is proportional to the moment of inertia of the wheel.

5. The method of claim 4, wherein the moment of inertia of the wheel is determined based on at least one of a weight of the electric bicycle, the number of motors, or a size of the wheel.

6. The method of claim 3, wherein the generating of the first wheel torque value includes performing an anti-windup control to limit an output value by controlling an integral value in integrating the difference between the wheel speed command and the wheel speed.

7. The method of claim 1, wherein the controlling of the motor comprises:
    detecting a driving current of the motor;
    generating a motor torque control current based on the difference between the wheel current command and the driving current of the motor and applying the motor torque control current to the motor.

8. The method of claim 1, wherein the generating of the pedal torque command comprises:
    generating a first pedal torque value by adding a value of the difference between the wheel speed command and the wheel speed multiplied by a proportional gain coefficient according to the pedal speed parameter with a value obtained by integrating the difference between the wheel speed command and the wheel speed and multiplying it by an integral gain coefficient according to the pedal speed parameter;
    generating a second pedal torque value by differentiating the difference between the wheel speed command and the wheel speed and then multiplying it by a moment of inertia of the pedal; and
    generating a pedal torque command by adding the first pedal torque value and the second pedal torque value and multiplying it by an assist ratio.

9. The method of claim 8, wherein the proportional gain coefficient according to the pedal speed parameter is proportional to the moment of inertia of the pedal.

10. The method of claim 9, wherein the moment of inertia of the pedal is determined based on the characteristics of the pedal regardless of a weight of the electric bicycle, the number of motors, or a size of the wheel.

11. The method of claim 8, wherein the generating of the first pedal torque value is performed by controlling to continuously integrate the difference between the wheel speed command and the wheel speed.

12. The method of claim 1, wherein the controlling of the generator comprises:
    detecting a driving current of the generator;
    generating a pedal current command based on the pedal torque command; and
    generating a generator torque control current based on the difference between the pedal current command and the driving current of the generator and applying the generator torque control current to the generator.

13. A system for controlling an electric bicycle, comprising:

a pedal speed sensor configured to detect a pedal speed;

a wheel speed sensor configured to detect a wheel speed;

a motor current sensor configured to detect a driving current of a motor;

a generator current sensor configured to detect a driving current of a generator;

a controller configured to control the electric bicycle;

a wheel actuator configured to control the motor; and a pedal actuator configured to control the generator, wherein the controller comprises:

a wheel speed controller configured to generate a wheel torque command by applying a wheel speed parameter to the difference between the wheel speed and the wheel speed command generated by multiplying the pedal speed by the gear ratio; and a pedal speed controller configured to generate a pedal torque command by applying a pedal speed parameter to the difference between the wheel speed command and the wheel speed.

14. The system of claim 13, wherein the wheel speed controller is configured to: receive the difference between the wheel speed command and the wheel speed; generate a first wheel torque value by adding a value of the difference between the wheel speed command and the wheel speed multiplied by a proportional gain coefficient according to the wheel speed parameter with a value obtained by integrating the difference between the wheel speed command and the wheel speed and multiplying it by an integral gain coefficient according to the wheel speed parameter; generate a second wheel torque value by differentiating the difference between the wheel speed command and the wheel speed and then multiplying it by a moment of inertia of the wheel; and generate a wheel torque command by adding the first wheel torque value and the second wheel torque value.

15. The system of claim 14, wherein the wheel speed controller is configured to perform an anti-windup control to limit an output value by controlling an integral value when integrating the difference between the wheel speed command and the wheel speed.

16. The system of claim 13, wherein the pedal speed controller is configured to: receive the difference between the wheel speed command and the wheel speed; generate a first pedal torque value by adding a value of the difference between the wheel speed command and the wheel speed multiplied by a proportional gain coefficient according to the pedal speed parameter with a value obtained by integrating the difference between the wheel speed command and the wheel speed and multiplying it by an integral gain coefficient according to the pedal speed parameter; generate a second pedal torque value by differentiating the difference between the wheel speed command and the wheel speed and then multiplying it by a moment of inertia of the pedal; and generate a pedal torque command by adding the first pedal torque value and the second pedal torque value and multiplying it by an assist ratio.

17. The system of claim 16, wherein the moment of inertia of the pedal is determined based on the characteristics of the pedal regardless of the weight of the electric bicycle, the number of motors, or the size of the wheel.

18. The system of claim 16, wherein the pedal speed controller is configured to generate the first pedal torque value by continuously integrating the difference between the wheel speed command and the wheel speed.

19. The system of claim 13, wherein the controller comprises:

a wheel torque controller configured to generate a wheel current command based on the wheel torque command generated by the wheel speed controller; and a pedal torque controller configured to generate a pedal current command based on the pedal torque command generated by the pedal speed controller.

20. The system of claim 19, wherein the wheel actuator is configured to control the motor by applying a motor torque control current generated based on the difference between the wheel current command and the detected driving current of the motor, and the pedal actuator is configured to control the generator by applying a pedal torque control current generated based on the difference between the pedal current command and the detected driving current of the generator.

* * * * *